United States Patent
Houston

(10) Patent No.: US 6,459,910 B1
(45) Date of Patent: Oct. 1, 2002

(54) USE OF SPEECH RECOGNITION IN PAGER AND MOBILE TELEPHONE APPLICATIONS

(75) Inventor: Theodore W. Houston, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/481,972

(22) Filed: Jun. 7, 1995

(51) Int. Cl.$^7$ ............................ H04Q 7/10; H04Q 7/06

(52) U.S. Cl. ................. 455/563; 455/550; 455/422; 455/458; 379/88.01; 379/88.02; 379/88.03; 379/88.04; 379/88.13

(58) Field of Search ................ 379/55, 56, 57, 379/58, 59, 67, 88, 89, 68; 395/2.41; 455/563, 403, 422; 368/63

(56) References Cited

U.S. PATENT DOCUMENTS

| | | | | |
|---|---|---|---|---|
| 4,408,099 A | * | 10/1983 | Ishii | 379/57 |
| 5,029,200 A | * | 7/1991 | Haas et al. | 379/67 |
| 5,086,394 A | * | 2/1992 | Shapira | 379/57 |
| 5,122,795 A | * | 6/1992 | Cubley et al. | 379/57 |
| 5,274,495 A | * | 12/1993 | Green | 379/88 |
| 5,297,183 A | * | 3/1994 | Bareis et al. | 379/67 |
| 5,351,276 A | * | 9/1994 | Doll, Jr. et al. | 379/67 |
| 5,444,673 A | * | 8/1995 | Mathurin | 368/63 |
| 5,481,255 A | * | 1/1996 | Albert et al. | 379/57 |
| 5,511,111 A | * | 4/1996 | Serbetcioglu et al. | 379/67 |
| 5,528,728 A | * | 6/1996 | Matsuura et al. | 395/2.41 |
| 5,592,531 A | * | 1/1997 | Cheng et al. | 379/56 |
| 5,652,789 A | * | 7/1997 | Miner et al. | 379/88 |

* cited by examiner

*Primary Examiner*—Lee Nguyen
*Assistant Examiner*—Keith Ferguson
(74) *Attorney, Agent, or Firm*—Robert L. Troike; Frederick J. Telecky, Jr.

(57) ABSTRACT

A method of and system for compressing and transmitting information which comprises recognizing a plurality of different types of information and providing a first representation of a recognized one of the plurality of different types of information having lower bandwidth transmission requirement than the recognized one of the plurality of different types of information. The first representation is transmitted to a remote receiver and a second representation of the recognized one of the recognized one of the plurality of different types of information at said remote receiver having greater information content than the first representation responsive to the first representation is provided. Responsive to the second representation, a recreation of the recognized one of the plurality of different types of information is provided. Recognizing includes providing a first data base and the second representation includes providing a second data base. The first data base provides the first representation in binary form and the second data base provides the second representation. The provision of a recreation of the recognized one of the plurality of different types of information responsive to the second representation is one of a visual display or a audible recreation.

44 Claims, 1 Drawing Sheet

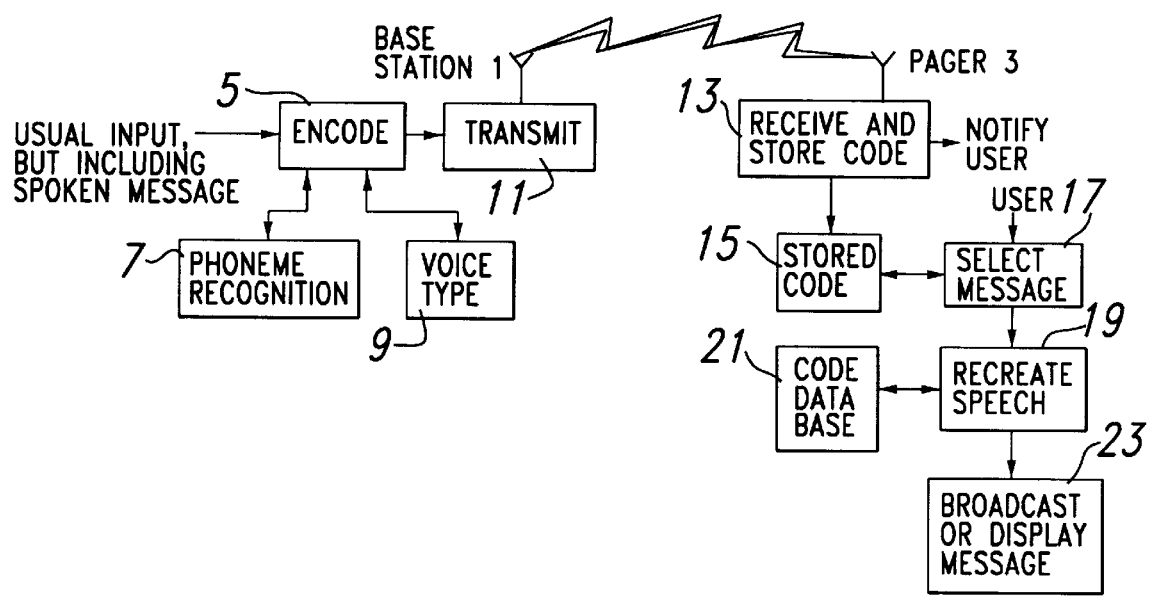

USE OF SPEECH RECOGNITION IN PAGER AND MOBILE TELEPHONE APPLICATIONS

BACKGROUND OF THE INVENTION

1. Field of the Invention

This invention relates to the use of a speech compression technique to reduce the amount of information required to enable reasonably accurate reproduction of the original speech such that it can be transmitted at low bandwidth for pager or low power mobile telephone systems.

2. Brief Description of the Prior Art

Pager systems use narrow bandwidth to transmit a phone number to a portable unit. When the portable unit receives the number, the user must go to a telephone to either receive a recorded message or to call the initiating number. Alternatively, the initiating caller can send a keyed in message. It would be desirable for the caller to provide a spoken message that would be transmitted to the pager, but that would require a wider bandwidth than is generally used by pager systems. It would further be desirable to be able to use a pager system to send a spoken reply message, but that again would require more bandwidth and would also require considerably more power in the portable unit.

There is a desire to have mobile phones operate for longer time periods on smaller batteries. One solution is to have a high density of relay stations so that low power transmission can be used. However, this will not always be possible and a high power transmission may sometimes be required to reach the nearest relay station. Thus, it would be desirable to have a system that reduces required transmission power by reducing the amount of data that is needed for conveying a message.

Speech recognition systems have now reached the degree of sophistication whereby they are capable of recognizing and identifying many spoken words and phrases or phonemes and providing digital codes for representation, storage, transmission and reproduction of such words or phrases and/or phonemes. Such digital code greatly compresses the original audio information, but retains sufficient information to allow recreation of the original speech in an understandable form. Word or phrase recognition provides the greatest compression while phoneme recognition is more flexible.

Transmission of analog information, particularly sound, generally requires a relatively large amount of power and relatively large bandwidth. It is readily apparent that, with the bandwidth restrictions being placed upon transmission channels, the amount of information required to be transmitted within the allowed limited channel bandwidth in order to provide the same or similar sound recognition information at the receiving end will require additional transmission time. While digital techniques require less bandwidth than do analog techniques, the amount of digital information required for accurate duplication of the analog signal is considerably more than required for the identification of words or phonemes. For example, a few bits can represent a word or phoneme, while several bits may be used to represent a fraction of a second of analog information, where the number of bits and the duration of time represented depends upon the accuracy of reproduction to be achieved. Since the power utilized in transmission of information or data is far greater than the power generally required to manipulate the information or data to be transmitted, it is apparent that any procedures that will minimize transmission power requirements will be extremely useful, especially when battery operated devices with limited power availability are involved. Bandwidth restrictions are also important. This minimization of transmission power requirements becomes extremely important in devices such as pagers and mobile telephones which are battery operated and have limited available power. It is apparent that the amount of information that can be received and/or transmitted by the pager or mobile telephone will have a direct relation to the amount of available power and bandwidth and this amount of received information can be increased if it can be transmitted more efficiently and the ratio of message information transmitted to power consumption and bandwidth required can be increased.

While the discussion herein is primarily directed to spoken input, it can also be applied to typed input. An abbreviated code can be assigned to words and phrases and this abbreviated code can be substituted for the input string of characters for storage and transmission.

SUMMARY OF THE INVENTION

In accordance with the present invention, information, primarily but not limited to speech, is compressed to reduce the amount of transmitted information required to enable intelligible reproduction of the original information at a remote location.

In the preferred embodiment, the information is compressed at a pager base station prior to transmission to the remote pager. The remote pager stores the transmitted compressed information and recreates the information from the stored code on command.

Briefly, the above compression is accomplished by recognizing certain information, such as phonemes and/or words or phrases and/or any other types of information capable of being identified by a relatively small amount of digital data. The recognizable information capable of being identified with a small amount of data is coded at the transmitting station by comparison with a data base and providing the digital coding for transmission. In addition, the type of voice is recognized, such as male, female, child, foreign accent or a particular individual and coding is sent indicating such voice type along with the other recognizable information, such as volume or pitch. The amount of information detected and transmitted relative to voice type will determine the accuracy with which the voice is reproduced at the remote station. However, though an increased amount of information will provide more accurate voice reproduction, it will also require that an increased amount of information be transmitted, thereby utilizing more data transmission time. Also, additional processing of the information will be required both for compression and recreation. It follows that a tradeoff must be made. However, by transmitting voice recognition information as well as information relative to phonemes, words, phrases and the like, a more accurate reproduction of the original voice can be provided with a greatly reduced amount of transmitted information. For example, if the voice characteristics of certain individuals are also coded in the data base at each terminal, a single code relative to the individual talking can be provided, thereby providing an accurate voice reproduction at the receiving end while only one voice identifier and phoneme data are being transmitted.

Optionally, users of the system can have voice characteristics stored in the system data base and input an assigned code (for example, saying their name) to select their voice characteristics for the speech recreation.

The coding is transmitted and the transmitted code is identified with a corresponding code at the receiving end (e.g., at the central station and the remote pager). When the particular information capable of being compressed in the manner described herein is recognized at the transmission end by comparison in a data base and the type of voice or individual speaking is also recognized by comparison in a data base, the particular binary codes in the data base for that information are transmitted to the remote unit (e.g., the pager or mobile telephone).

The coded information to describe the type of information sent is preferably binary, thereby requiring very limited bandwidth for transmission. Also, the binary number representative of the information capable of being compressed can be transmitted to the remote location using much less power since the amount of data to be transmitted is substantially reduced. This coded information received at the remote location, such as a pager or mobile telephone, is used to reconstruct the information capable of being compressed as well as the voice type from the data base therein which has the same coded information as in the data base at the transmitting end. As stated above, in the case of a spoken message, the transmitted data can provide additional information such as, for example, whether the voice was male, female, a youth, accented, a particular individual, etc. in order to reproduce the original sound more closely. The remote station can also have some or all of the operational capabilities of the transmitting station, thereby permitting at least some type of communication in both directions. For mobile telephone applications, the preferred form is to have the mobile unit receive information in the standard format and to transmit information in the encoded format to save transmission power. The base station would optionally recreate audio information (either analog or digital) from the encoded information for further transmission in the telephone network. Optionally, the mobile unit could switch from standard transmission to encoded transmission, depending upon battery status and distance from the receiving station.

The representation of the phoneme or other information can be altered to the point that it is still recognizable, be close to the sound of the originally spoken information and yet can be transmitted using much less information than that required to transmit the phoneme as originally expressed.

BRIEF DESCRIPTION OF THE DRAWING

The FIGURE is a schematic diagram of a paging system in accordance with the present invention.

DESCRIPTION OF THE PREFERRED EMBODIMENT

Referring now to the FIGURE, there is shown a pager system having a base transmitting section 1 and a receiving section 3 in the form of a pager. It should be understood that the transmitting section 1 can also be a receiving section and the receiving section 3 can also be a transmitting section to provide a two-way pager if sufficient power capability is available at the pager section 3.

Speech which requires a relatively large bandwidth for accurate reproduction is generated by a voice or the like at the transmitting section 1 and is sensed by an encoder 5 which includes a data base represented by way of example in the FIGURE by a phoneme recognition unit 7 of standard type having its own data base and a voice type recognition unit 9 having its own data base. The phonemes detected by phoneme recognition unit 7 require a relatively large bandwidth for accurate transmission are compared with the phoneme data base which matches the recognized phoneme and provides a binary number corresponding to the encoder in standard manner. The voice type unit 9 determines the type of voice or a specific person's voice by recognition of pitch and harmonic content, or by input code, and by comparison with the data base therein and provides a binary number corresponding to the voice type information received. The binary numbers corresponding to the detected phoneme requires substantially less data than the original analog signal or digital representation of the analog signal for accurate transmission of the phonemes themselves and therefore less transmission power and less bandwidth are required than does the phoneme itself as originally applied to the data base 9. The amount of binary data required to provide voice recognition is also small with the amount of data required to transmit both phoneme and voice recognition data being far less than that required to provide transmission of the original analog equivalent.

The binary information indicative of voice type and phonemes detected at encoder 5 is then transmitted by a transmitter 13, at low bandwidth and relatively low power requirement compared with that required if the phoneme in analog form or digital representation of the analog form were transmitted, to the receiver 13 of the receiving station 3. The receiving station 3 is a pager or mobile telephone unit in the preferred embodiment. The receiver 13 receives the binary signals and stores these signals for later use in storage 15 or operates upon these signals concurrently with reception. Upon conditioning by the user, the pager then recreates the analog or digital representation of the sound in conjunction with a data base. This is accomplishes by selecting a message from the stored code 15 with a code selector 17 where the storage option is provided and utilized and passing this code via the recreation circuit 19 to the code data base 21. The code data base 21 recreates the phonemes and voice type by comparison of the code with code in the data base and returning the recreated information to the recreation circuit. The recreation circuit 19 determines whether the message is aural or visual. If the message is aural, then the phonemes with voice type are provided in aural form by the broadcast and display device 23 with original voice type reproduced to the extent coded. If the message is visual, then the message is displayed on a display in device 23 in standard manner.

Upon receipt of information at the receiver 13, a signal can be provided by the pager in standard manner to indicate such reception.

The receiving station 3 requires relatively low power operation since it receives a binary representation addressed to more complex information stored in its code data base 21. Sections 19, 21 and 23 can be powered only as required when the user elects to hear a message.

In the above described embodiment, the amount of information contained in the binary number transmitted can be varied, as desired, this amount generally being a tradeoff among reproduction quality, transmission time and circuit complexity.

In addition, it is apparent that the circuitry shown can be used to transmit from the receiving unit 3 back to the receiving unit 1 in the same manner as demonstrated above from the transmitting unit 1 to the receiving unit 3. Alternatively, encoding and decoding can both be accomplished at mobile units, optionally with a base station and normal telephone networks for relaying the encoded information. In another alternative, the base station broadcasts selected encoded messages.

Though the invention has been described with reference to specific preferred embodiments thereof, many variations and modification will immediately become apparent to those skilled in the art. It is therefore the intention that the appended claims be interpreted as broadly as possible in view of the prior art to include all such variations and modifications.

What is claimed is:

1. A pager system which comprises:
   (a) voice recognition means for recognizing voice produced information and a characteristic of the voice produced information and providing a phoneme-identifying first representation of the voice produced information having reduced bandwidth transmission requirement relative to the recognized voice produced information and a representation of the characteristic of the voice produced information;
   (b) transmission means for phonemically transmitting the first representation of the voice produced information and the characteristic of the voice produced information to receiving means;
   (c) receiving means responsive to the first representation of the voice produced information for providing a phonemically-identifying second representation of the first representation of the voice produced information of increased bandwidth relative to the first representation; and
   means responsive to the second representation and the characteristic of the voice produced information for phonemically recreating the voice produced information and the characteristic of the voice produced information.

2. The system of claim 1 wherein said means for providing a first representation includes a first data base responsive to said voice produced information.

3. The system of claim 2 wherein said means for providing a second representation includes a second data base responsive to said first representation.

4. The system of claim 3 wherein said first data base provides said first representation in binary form and said second data base provides said second representation.

5. The system of claim 4 wherein said means responsive to said second representation is one of a visual display or an audible recreation.

6. The system of claim 5 wherein said first representation is a combination of phoneme information and voice type information.

7. The system of claim 2 wherein said first data base provides said first representation in binary form.

8. The system of claim 3 wherein said means responsive to said second representation is one of a visual display or an audible recreation.

9. The system of claim 1 wherein said means for providing a second representation includes a second data base responsive to said first representation.

10. The system of claim 9 wherein said second data base provides said second representation in binary form.

11. The system of claim 1 wherein said means responsive to said second representation is one of a visual display or an audible recreation.

12. The system of claim 1 wherein said first representation is a combination of phoneme information and voice type information.

13. The system of claim 1 wherein said characteristic of said voice type information is one of a male or female voice.

14. The system of claim 1 wherein said characteristic of said voice type information is one of an accented male or accented female voice.

15. The system of claim 1, further including means at said receiving means for storing one of said first or second representations of said voice produced information and indicator means at said receiving means to indicate said storing of one of said first or second representations.

16. The radio transmitter of claim 15 wherein the voiced message signal has a non-phonemic component indicating a speaker's voice type (e.g. male, female, child, foreign accent) and the encoder has a voice type recognition database storing data for recognizing each voice type and assigning it a corresponding voice type identification number.

17. A method of paging which comprises the steps of:
    (a) recognizing voice produced information and a characteristic of the voice produced information and providing a phoneme-identifying first representation of the voice produced information having reduced bandwidth transmission requirement relative to the recognized voice produced information and a representation of the characteristic of the voice produced information;
    (b) phonemically transmitting the first representation of the voice produced information and the characteristic of the voice produced information to a receiver;
    (c) providing a phoneme-identifying second representation of the first representation of increased bandwidth relative to the first representation at the receiver; and
    (d) phonemically recreating the voice produced information and the characteristic of the voice produced information responsive to the second representation and the characteristic of the voice produced information.

18. The method of claim 17 wherein said step of recognizing includes providing a first data base responsive to said voice produced information.

19. The method of claim 18 wherein said step of providing a second representation includes the step of providing a second data base responsive to said first representation.

20. The method of claim 19 wherein said first data base provides said first representation in binary form and said second data base provides said second representation.

21. The method of claim 20 wherein said step of providing a recreation of said recognized one of said plurality of different types of information responsive to said second representation is one of a visual display or an audible recreation.

22. The method of claim 18 wherein said first data base provides said first representation in binary form.

23. The method of claim 19 wherein said step of providing a recreation of said recognized one of said plurality of different types of information responsive to said second representation is one of a visual display or an audible recreation.

24. The method of claim 21 wherein said first representation is a combination of phoneme information and voice type information.

25. The method of claim 17 wherein said step of providing a second representation includes the step of providing a second data base responsive to said first representation.

26. The method of claim 25 wherein said second data base provides said second representation in binary form.

27. The method of claim 17 wherein said step of providing a recreation of said recognized one of said plurality of different types of information responsive to said second representation is one of a visual display or an audible recreation.

28. The method of claim 17 wherein said first representation is a combination of phoneme information and voice type information.

29. The method of claim 17 further including the step of storing one of said first or second representations of said voice produced information and indicating at said receiver the storage of one of said first or second representations.

30. A pager system comprising:
(a) a base station for receiving a standard telephone voice message, encoding the message into a phoneme-identifying reduced binary representation thereof and transmitting the encoded representation as a stream of phoneme identification numbers; and
(b) a mobile unit for receiving the encoded representation and recreating an expanded representation of the phoneme-identifying reduced binary representation of the voice message.

31. The system of claim 30 wherein said encoding is provided by phoneme recognition.

32. The system of claim 31 wherein said encoding includes code representing voice characteristics.

33. The system of claim 32 wherein said mobile unit includes means for storing said encoded representation and reproducing a representation of the voice message on command.

34. The system of claim 31 wherein said mobile unit includes means for storing said encoded representation and reproducing a representation of the voice message on command.

35. The system of claim 30 wherein said encoding is provided by speech recognition.

36. The system of claim 35 wherein said mobile unit includes means for storing said encoded representation and reproducing a representation of the voice message on command.

37. The system of claim 30 wherein said mobile unit includes means for storing said encoded representation and reproducing a representation of the voice message on command.

38. A communication system comprising:
(a) a mobile unit for receiving a voice message and encoding said voice message to a reduced binary representation thereof and transmitting said reduced binary representation to a base station; and
(b) a base station for receiving said binary representation, recreating a representation of said voice message in standard telephone format for transmission in a standard telephone network.

39. A communication system comprising:
(a) a mobile unit for receiving a voice message and encoding said voice message to a reduced binary representation thereof and transmitting said reduced binary representation to a base station, and
(b) a base station for receiving said binary representation, recreating a representation of said voice message in standard telephone format for transmission in a standard telephone network; said base station includes a data base having voice characteristics of system users stored therein for use in recreating said voice message.

40. A pager system which comprises:
(a) voice recognition means for recognizing voice produced information and providing a phoneme-identifyng first representation of the voice produced information having reduced bandwidth transmission requirement relative to the recognized voice produced information;
(b) transmission means for phonemically transmitting the first representation of the voice produced information to receiving means;
(c) receiving means responsive to the first representation of the voice produced information for providing a phoneme-identifying second representation of the first representation of the voice produced information of increased bandwidth relative to the first representation; and
(d) means responsive to the second representation for phonemically recreating the voice produced information.

41. A method of paging which comprises the steps of:
(a) recognizing voice produced information and providing a phoneme-identifying first representation of the voice produced information having reduced bandwidth transmission requirement relative to the recognized voice produced information;
(b) phonemically transmitting the first representation of the voice produced information to a receiver;
(c) providing a phoneme-identifying second representation of the first representation of increased bandwidth relative to the first representation at the receiver; and
(d) phonemically recreating the voice produced information responsive to the second representation.

42. A radio transmitter for phonemically transmitting a voiced message signal spoken in a particular language having a set of phonemes, comprising:
an encoder, having a phonemic recognition database storing data for recognizing each phoneme and assigning it a corresponding distinct phoneme identification number for analyzing the voiced message signal into a stream of phoneme identification numbers, and
radio transmitter for transmitting a radio signal modulated by the stream of phonemic identification numbers.

43. A radio receiver for converting a radio signal modulated by a corresponding stream of phonemic identification numbers into a corresponding voiced message signal, comprising:
a radio receiver for receiving the radio signal and recovering the stream of phonemic identification numbers from it; and
a decoder, having a phonemic speech generation database storing data for synthesizing the stream of phoneme identification numbers back into the corresponding voiced message signal.

44. The radio receiver of claim 43 for receiving radio signals further modulated by a voice type identification number, wherein the radio receiver receives and recovers the voice type identification number, and
the decoder has a voice type generation database storing data for synthesizing the voiced message signal with a voice type that corresponds to the voice type identification number.

* * * * *